United States Patent
Hong et al.

(10) Patent No.: US 9,740,856 B2
(45) Date of Patent: Aug. 22, 2017

(54) APPARATUS AND METHOD FOR MANAGING GAMING ENGINE FILE IN A MOBILE PLATFORM

(71) Applicant: SEWORKS, Inc., Seoul (KR)

(72) Inventors: Min Pyo Hong, Seoul (KR); Dong Seon Kim, Busan (KR); Hyoung Kyu Choi, Seoul (KR); Chung Hui Kim, Seoul (KR); Seok Ha Lee, Gyeonggi-do (KR)

(73) Assignee: SEWORKS, Inc., Seoul (KR)

( * ) Notice: Subject to any disclaimer, the term of this patent is extended or adjusted under 35 U.S.C. 154(b) by 39 days.

(21) Appl. No.: 14/821,669

(22) Filed: Aug. 7, 2015

(65) Prior Publication Data

US 2016/0335422 A1 Nov. 17, 2016

(30) Foreign Application Priority Data

May 13, 2015 (KR) ........................ 10-2015-0066595

(51) Int. Cl.
*G06F 21/54* (2013.01)
*G06F 21/12* (2013.01)
*G06F 21/14* (2013.01)

(52) U.S. Cl.
CPC .............. *G06F 21/54* (2013.01); *G06F 21/12* (2013.01); *G06F 21/121* (2013.01); *G06F 21/123* (2013.01); *G06F 21/125* (2013.01); *G06F 21/14* (2013.01)

(58) Field of Classification Search
CPC ........ G06F 21/12; G06F 21/14; G06F 21/121; G06F 21/123; G06F 21/125; G06F 21/126; G06F 21/128

USPC .......................................................... 713/189
See application file for complete search history.

(56) References Cited

U.S. PATENT DOCUMENTS 6,052,780 A * 4/2000 Glover .................... G06F 21/10
                                                      380/255
9,208,348 B1 * 12/2015 Brennan ............. G06F 21/6209
9,330,253 B2 * 5/2016 Lee ......................... G06F 21/51
(Continued)

FOREIGN PATENT DOCUMENTS

KR 10-1161778 1/2012

*Primary Examiner* — Hadi Armouche
*Assistant Examiner* — Shahriar Zarrineh
(74) *Attorney, Agent, or Firm* — Intellectual Property Law Group LLP (57) ABSTRACT

The present invention relates to managing a UNITY file in a mobile platform in order to forestall a UNITY library executable in a mobile platform from being analyzed by reverse engineering and decompiling and provides an apparatus for managing a UNITY file in a mobile platform comprising a file extracting section that extracts a UNITY library file from a UNITY application; an encrypting section that encrypts a programming library file in the UNITY library file thus extracted and creates an encrypted programming library file; a file creating section that creates a decrypting library to decrypt the encrypted programming library file and creates a secured UNITY application using the decrypting library and the encrypted programming library file; and a file executing section that, upon request to execute the secured UNITY application, executes the secured application by decrypting the encrypted programming library file using the decrypting library.

2 Claims, 7 Drawing Sheets

(56) References Cited

U.S. PATENT DOCUMENTS

| | | | |
|---|---|---|---|
| 2002/0066022 A1* | 5/2002 | Calder | G06F 21/121 |
| | | | 726/26 |
| 2004/0198496 A1* | 10/2004 | Gatto | A63F 13/12 |
| | | | 463/42 |
| 2006/0183526 A1* | 8/2006 | Verardi | A63F 1/00 |
| | | | 463/13 |
| 2014/0059708 A1* | 2/2014 | Chou | G06F 21/10 |
| | | | 726/30 |
| 2014/0173761 A1* | 6/2014 | Hong | G06F 21/10 |
| | | | 726/30 |
| 2014/0181896 A1* | 6/2014 | Yablokov | H04L 63/10 |
| | | | 726/1 |
| 2014/0282438 A1* | 9/2014 | Liberant | G06F 8/315 |
| | | | 717/140 |
| 2016/0019040 A1* | 1/2016 | Byun | G06F 8/51 |
| | | | 717/137 |
| 2016/0071355 A1* | 3/2016 | Morrison | G07F 17/3239 |
| | | | 463/7 |
| 2016/0080420 A1* | 3/2016 | Ray | H04L 63/20 |
| | | | 726/1 |
| 2016/0203087 A1* | 7/2016 | Nam | G06F 21/52 |
| | | | 713/191 |
| 2016/0277194 A1* | 9/2016 | Sun | H04L 9/3247 |

* cited by examiner

FIG. 1 demo ▸ assets ▸ bin ▸ Data ▸ Managed

Name

- Assembly-CSharp.id0
- Assembly-CSharp.id1
- Assembly-CSharp.nam
- Assembly-CSharp.til
- Assembly-CSharp.dll
- Mono.Security.dll
- mscorlib.dll
- System.dll
- UnityEngine.dll

FIG. 2

| Name | Date Modified | Size | Kind |
|---|---|---|---|
| Assembly-CSharp-firstpass.dll | Feb 4, 2015, 4:43 AM | 46 KB | Mono...library |
| Assembly-CSharp.dll | Feb 4, 2015, 6:12 PM | 454 KB | Mono...library |
| Assembly-UnityScript-firstpass.dll | Feb 4, 2015, 4:43 AM | 3 KB | Mono...library |
| HOTween.dll | Feb 4, 2015, 4:43 AM | 82 KB | Mono...library |
| JsonFx.Json.dll | Feb 4, 2015, 4:43 AM | 17 KB | Mono...library |
| mono | Feb 4, 2015, 4:43 AM | -- | Folder |
| mscorlib.dll | Feb 4, 2015, 4:43 AM | 1 MB | Mono...library |
| P31RestKit.dll | Feb 4, 2015, 4:43 AM | 28 KB | Mono...library |
| Photon3Unity3D.dll | Feb 4, 2015, 4:43 AM | 92 KB | Mono...library |
| System.Core.dll | Feb 4, 2015, 4:43 AM | 8 KB | Mono...library |
| System.dll | Feb 4, 2015, 4:43 AM | 71 KB | Mono...library |
| UnityEngine.dll | Feb 4, 2015, 4:43 AM | 183 KB | Mono...library |

APPARATUS AND METHOD FOR MANAGING GAMING ENGINE FILE IN A MOBILE PLATFORM

CROSS-REFERENCE TO RELATED APPLICATION

This application claims foreign priority under 35 U.S.C. §119 to Korean Patent Application no. 10-2015-0066595, filed in the Republic of Korea on May 13, 2015, the entire contents of which are hereby incorporated by reference.

BACKGROUND

Field of Invention

The present invention relates to managing a file in a mobile platform and, more specifically, to an apparatus and a method for managing a UNITY file in a mobile platform in order to forestall a UNITY library executable in a mobile platform from being analyzed by reverse engineering and decompiling.

Background Art

As mobile terminal technology rapidly develops, individual users increasingly use smartphones. A smartphone user can find various mobile applications at an app store and conveniently purchase what he or she wants, which explains one of the most important merits of a smartphone. Especially, as mobile game market remarkably grows recently, various game engines attract attention. Among others, UNITY game engine that Unity Technologies has developed is given an excellent development environment in that it is compatible with Windows, Mac, IOS, ANDROID and Web and supports diverse consoles such as Xbox 360, Wii, PS3, etc. The material a developer input in UNITY is formed to a .dll (dynamic link library) file. A .dll file has bytecode identical to that of .class of Java or a .dex of ANDROID. Therefore, the source code of a .dll in UNITY engine may be disclosed by decompiling.

PRIOR ART DOCUMENT

Patent Document

Patent Document 1: Korean Notice of Publication of Registered Patent No. 10-1161778 (Jul. 3, 2012)

SUMMARY

Technical Problem

The present invention provides an apparatus and a method for managing a UNITY file in a mobile platform, by encrypting a programming library file developed by means of UNITY, in order to forestall a UNITY library file from being analyzed via reverse engineering and decompiling. The present invention also provides an apparatus and a method for managing a UNITY file in a mobile platform, upon executing a UNITY library file, invokes a decrypting library exactly and executes an application by including a function that can invoke the decrypting library to decrypt a programming library file that has been encrypted in the UNITY library file.

Technical Solution

To achieve the objectives, the present invention provides an apparatus for managing a UNITY file in a mobile platform including a file extracting section that extracts a UNITY library file from a UNITY application; an encrypting section that encrypts a programming library file in the UNITY library file thus extracted and creates an encrypted programming library file; a file creating section that creates a decrypting library to decrypt the encrypted programming library file and creates a secured UNITY application using the decrypting library and the encrypted programming library file; and a file executing section that, upon request to execute the secured UNITY application, executes the secured application by decrypting the encrypted programming library file using the decrypting library.

According to the present invention, if the UNITY application has a format that is executable in the ANDROID platform, the file creating section calculates an address from which the decrypting library is invoked by obtaining and using the basic address of the UNITY application and the address of the function to hook, and creates the secured UNITY application so that the decrypting library is to be invoked from the calculated address. In addition, if the UNITY application has a format that is executable in the IOS platform, the file creating section of the apparatus for managing a UNITY file in a mobile platform according to the present invention, creates the secured UNITY application by finding an area that the executable file in the UNITY library does not use and adding to the unused area a file-reading function that can read the decrypting library.

To achieve the objectives, the present invention also provides a method for managing a UNITY file in a mobile platform including a step via which a file extracting section extracts a UNITY library file from a UNITY application; a step via which an encrypting section encrypts a programming library file in the UNITY library file thus extracted and creates an encrypted programming library file; a step via which a file creating section creates a decrypting library to decrypt the encrypted programming library file; a step via which the file creating section creates a secured UNITY application using the decrypting library and the encrypted programming library file; a step via which a file executing section loads, upon request to execute the secured UNITY application, the UNITY library of the secured UNITY application onto a memory; and a step via which the file executing section executes the secured UNITY application by decrypting the encrypted programming library file using the decrypting library in the secured UNITY application.

According to the present invention, if the UNITY application has a format that is executable in the ANDROID platform, the step that creates the secured UNITY application includes a step that obtains the basic address of the UNITY application and the address of the function to hook; a step that calculates, using the basic address and the obtained address, an address from which the decrypting library is invoked and creates a invoking function so that the decrypting library is to be invoked from the calculated address; and a step that creates the secured UNITY application using the UNITY library including the invoking function, encrypted programming library and decrypting library.

In addition, if the UNITY application has a format that is executable in the IOS platform, the step that creates the secured UNITY application includes a step that finds an area that the executable file in the UNITY library does not use; a step that adds to the unused area a file-reading function that can read the decrypting library; and a step that creates the secured UNITY application using the executable file that includes the file-reading function and the encrypted programming library.

Advantageous Effects of Invention

An apparatus and a method for managing a UNITY file in a mobile platform according to the present invention forestall, by encrypting a programming library file developed by UNITY engine, a UNITY library file from being analyzed by means of reverse engineering and decompiling.

DETAILED DESCRIPTION OF SPECIFIC EMBODIMENTS

Best Mode

Embodiments of the present invention will now be described in detail with reference to accompanying drawings.

Figure 1:
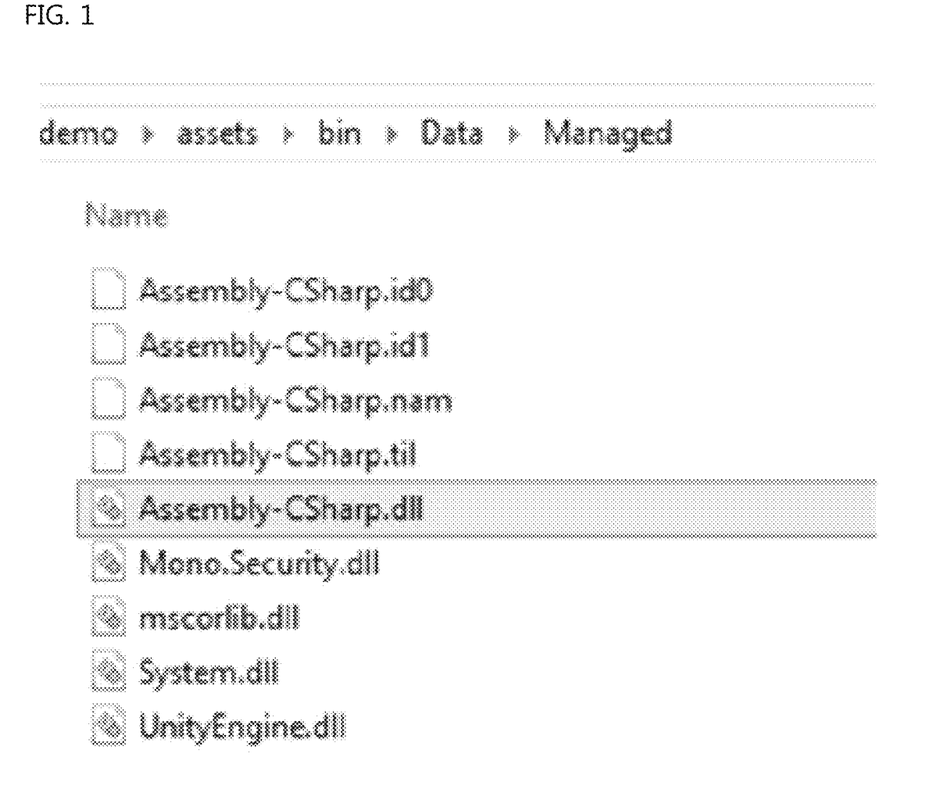
FIG. 1 is a diagram that illustrates a folder structure according to an embodiment of the present invention where a UNITY file is stored in an APK file that is used in the ANDROID platform.

FIG. 1 is a diagram that illustrates a folder structure according to an embodiment of the present invention where a UNITY file is stored in an APK file that is used in the ANDROID platform. As illustrated in FIG. 1, a UNITY library file is saved in the directory of 'assets>bin>data>managed' and compressed into 'assembly-Csharp.dll' form in an APK file.

Figure 2:
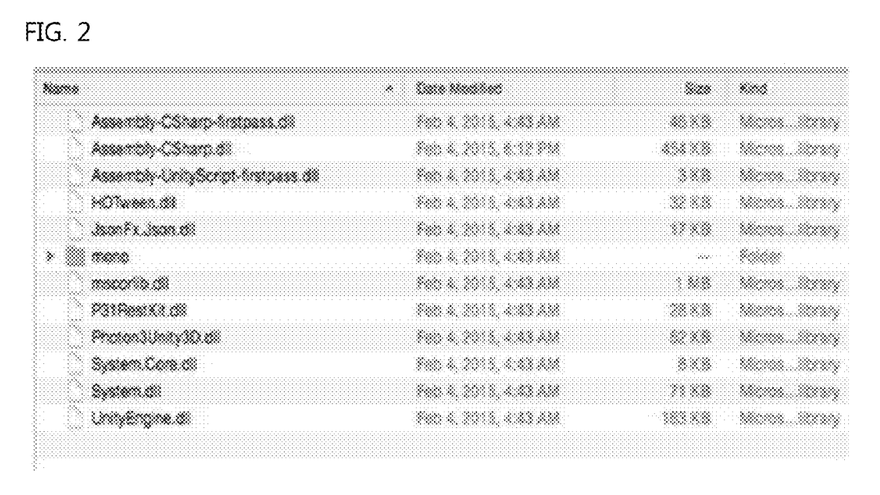
FIG. 2 is a diagram that illustrates a folder structure according to another embodiment of the present invention where a UNITY file is stored in an IPA file that is used in the IOS platform.

FIG. 2 is a diagram that illustrates a folder structure according to another embodiment of the present invention where a UNITY file is stored in an IPA file that is used in the IOS platform. As illustrated in FIG. 2, a UNITY library file is compressed into 'asssembly-Csharp.dll' form in an IPA file as an APK file in the ANDROID platform.

Figure 3:
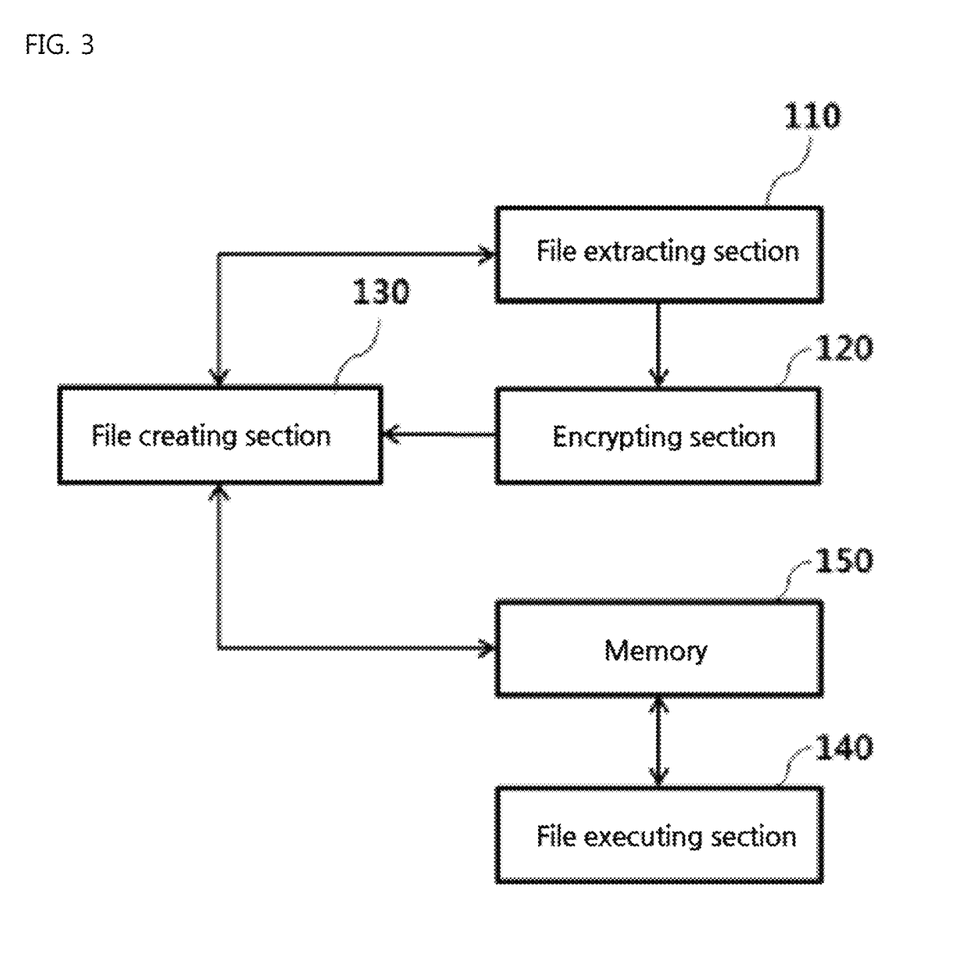
FIG. 3 is a block diagram that illustrates an apparatus for managing a file for a UNITY application according to an embodiment of the present invention.

An apparatus for managing a UNITY file or a UNITY application, which is compressed in an APK or IPA file with the structure, that protects and executes the file or application in order to forestall the file or application from being analyzed by means of decompiling or reserve engineering with reference to FIG. 3.

Figure 4:
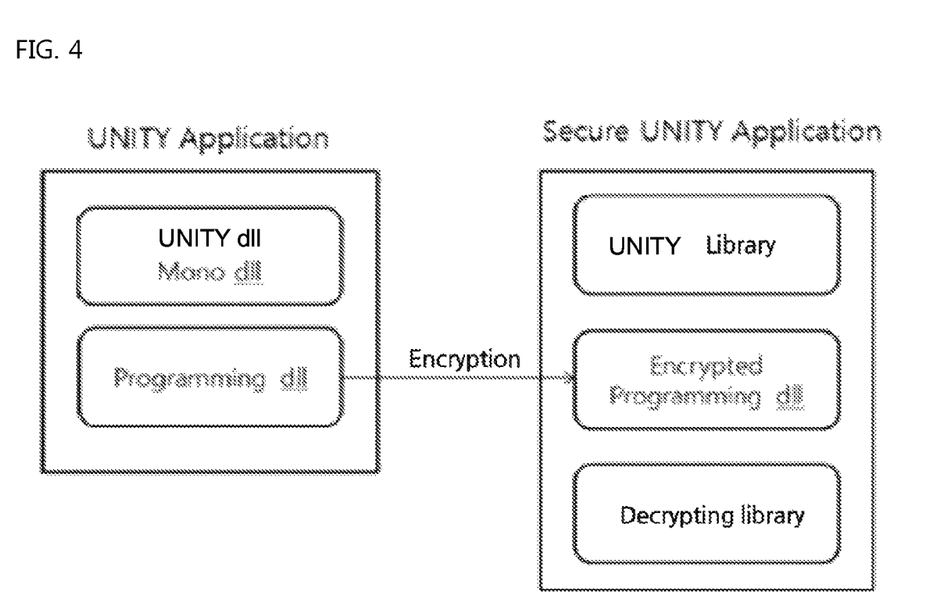
FIG. 4 is a diagram that illustrates a UNITY application and a secured UNITY application in the ANDROID platform according to an embodiment of the present invention.
Figure 5:
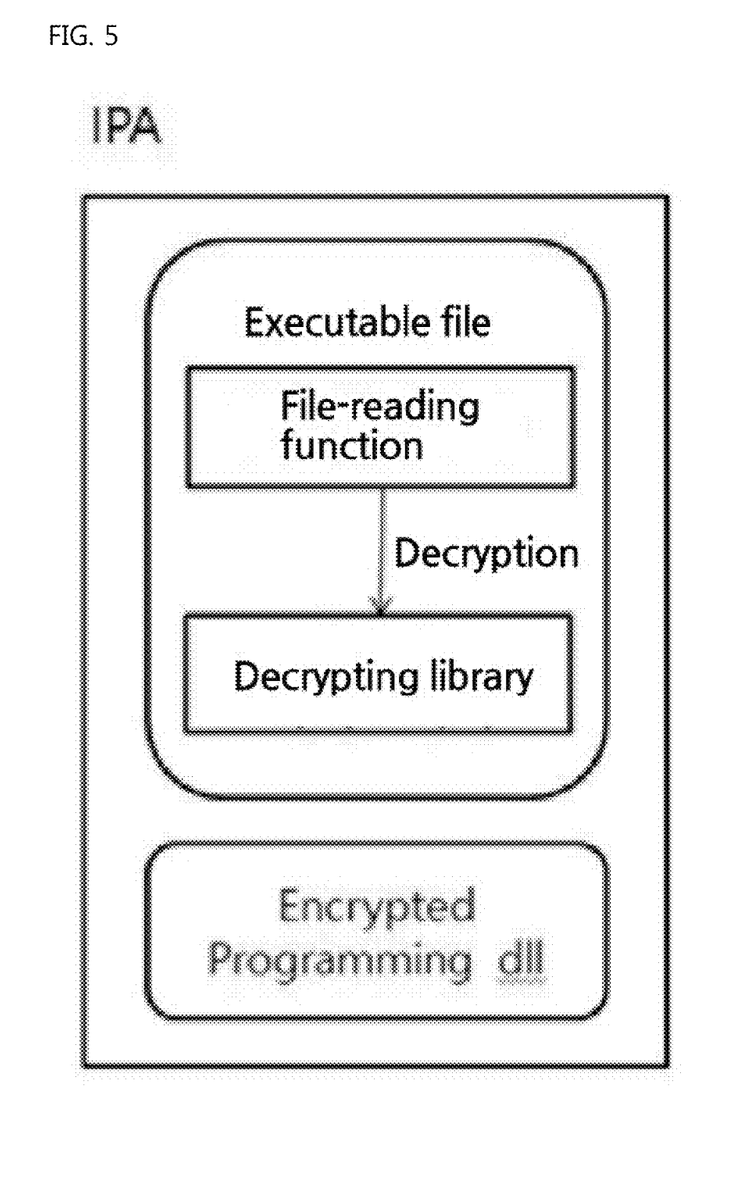
FIG. 5 is a diagram that illustrates a UNITY application and a secured UNITY application in the IOS platform according to another embodiment of the present invention.

FIG. 3 is a block diagram that illustrates an apparatus for managing a file for a UNITY application according to an embodiment of the present invention; FIG. 4 is a diagram that illustrates a UNITY application and a secured UNITY application in the ANDROID platform according to an embodiment of the present invention; and FIG. 5 is a diagram that illustrates a UNITY application and a secured UNITY application in the IOS platform according to another embodiment of the present invention. A UNITY application according to an embodiment of the present invention is defined as an APK file or an IPA file that is created by UNITY engine and executed in a mobile platform such as ANDROID and IOS.

An apparatus for managing a UNITY file in a mobile platform the present invention provides may include, as illustrated in FIG. 3, a file extracting section 110, an encrypting section 120, a file creating unit 130, a file executing section 140 and a memory 150. The file extracting section 110 reads a dynamic link library in a UNITY application that is stored in the memory 150 of a device such as smartphone that operates on the ANDROID platform and provides the encyrypting section 120 with the dynamic link library. More specifically, as illustrated in FIG. 4, the file extracting section 110 decompresses the APK file, accesses folders of 'assets>bin>data>managed', extracts the UNITY library file, Unity.dll, and the programming library file, Programming.dll, and provides the extracted programming library file to the encrypting section 120, and provides the extracted UNITY library file to the file creating section 130.

Meanwhile, the file extracting section 110 decompresses an IPA file stored in the memory 150 of a device such as smartphone that operates on the IOS platform, reads a UNITY library file and provides the encrypting section 120 with the UNITY library file. More specifically, as illustrated in FIG. 5, the file extracting section 110 decompresses an IPA file, extracts an executable file and programmed library file and provides the extracted programming library file to the encrypting section 120. The encrypting section 120 creates an encrypted programming library file by encrypting the programming library file, wherein the programming library file is created by the programming of the developer and included in a UNITY library file as a dynamic link library.

The file creating section 130 creates a decrypting library that can decrypt the encrypted programming library and creates a protected UNITY application by recompressing the created decrypting library, the encrypted programming library and the UNITY library. The decrypting library created by the file creating section 130 may have a form of code, for example binary code, or a function that is supported in the mobile platform.

A procedure via which the file creating section 130 creates a protected UNITY application in the ANDROID platform and the IOS platform, respectively, will be described. In the ANDROID platform, the file creating section 130 finds the basic address of the UNITY application using the system process map in the ANDROID platform and obtains the address (got address) of a function to hook in the ELF (executable and linking format) system using a command or parser. Then, the file creating section 130 calculates the address of a function to hook by, for example, summing up the obtained address and the basic address, and includes an invoking function in the UNITY library so that the decrypting is invoked from the address calculated by the UNITY library when the protected UNITY application is executed.

In the next step, the file creating section 130 creates the UNITY application by compressing the UNITY library, encrypted programming library and decrypting library that includes the invoking function. In the IOS platform, the file creating section 130 finds an unused area in an executable file of the UNITY application such as .IPA file and adds the decrypting library to the unused area. Then, the file creating section 130 creates a file-reading function that has an address of the decrypting library and creates a protected UNITY application by recompressing the file-reading function and decrypting library.

The memory 150 stores various forms of files, for example, APK file, IPA file, C/C++library, required for operating the ANDROID of IOS platform. When executing the protected UNITY application, the protected UNITY library may be loaded onto the memory 150. Upon request for executing the protected UNITY application, the file executing section 140 executes the functions in the UNITY library by loading the UNITY library onto the memory 150 and invokes the decrypting library in the UNITY library by means of the invoking function or file-reading function.

Then the file executing section 140 creates the original programming library by decrypting the encrypted programming library by means of the decrypting library and executes the UNITY application by executing the created programming library. Meanwhile, the invoking function may use a library function among various library functions provided for the ANDROID platform while the file-reading function may use a library function among various library functions provided for the IOS platform.

An operation of an apparatus for managing a file that has such a configuration will be described with reference to FIGS. 6 and 7.

Figure 6:
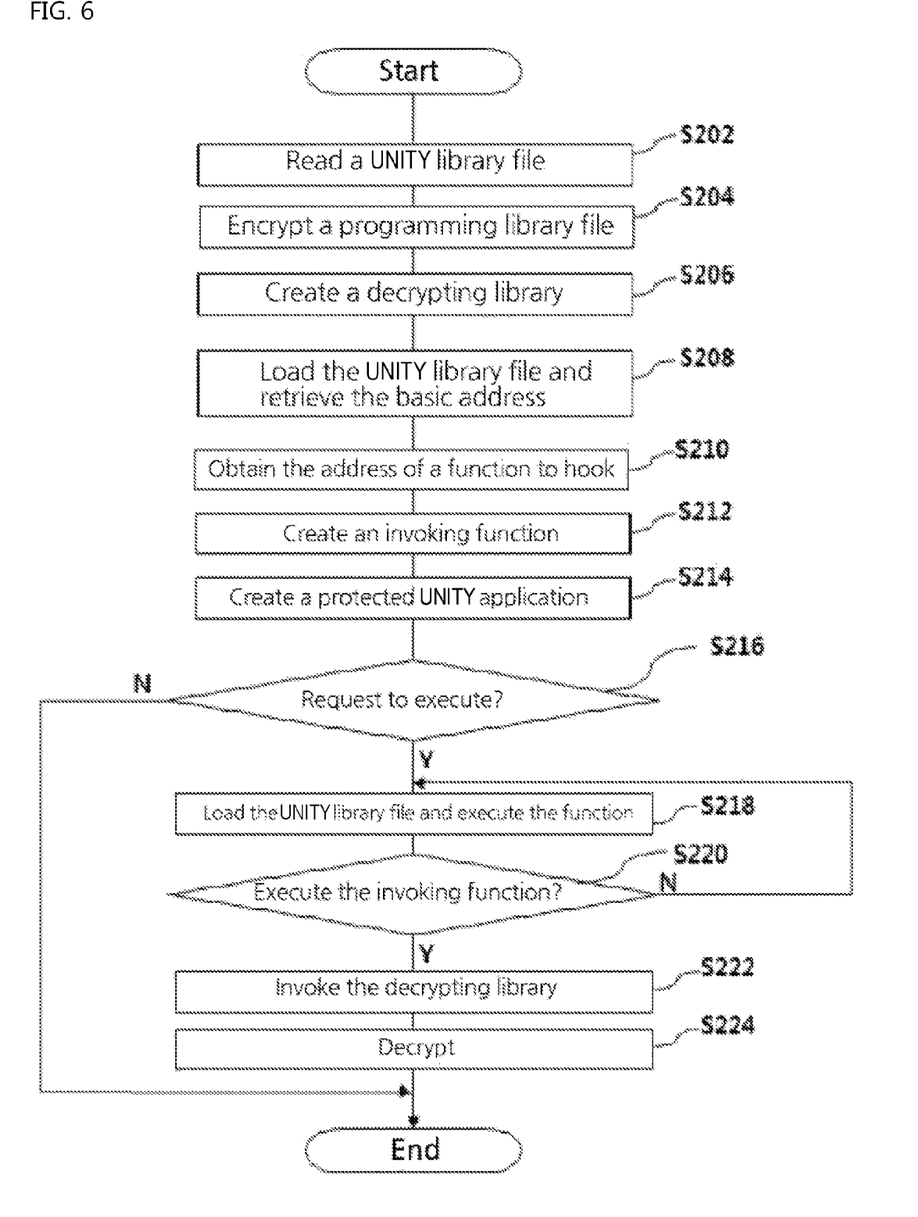
FIG. 6 is a flowchart that illustrates a procedure through which an apparatus for managing a file according to an embodiment of the present invention protects and executes a UNITY application for the ANDROID platform.

FIG. 6 is a flowchart that illustrates a procedure through which an apparatus for managing a file according to an embodiment of the present invention protects and executes a UNITY application for the ANDROID platform.

As illustrated in FIG. 6, the file extracting section 110 decompresses the UNITY application, or the APK file, in the memory 150 and reads the UNITY library file (S202). The encrypting section 120 encrypts the programming library file in the UNITY library file (S204) then provides the encrypted programming library file to the file creating section 130. The file creating section 130 creates the decrypting library that decrypts the encrypted programming library file (S206), loads the UNITY library file read in S202 onto the memory 150 then retrieves the basic address of the UNITY application in the process map of the ANDROID platform (S208). Then the file creating section 130, by using a command or parser provided for the ANDROID platform, obtains the address of the function to hook in the UNITY library file (S210). Then, the file creating section 130 calculates, by summing up the obtained address and the basic address, the address of the function to hook in the UNITY library file and creates the invoking function that invokes the decrypting library from the calculated address of the function (S211). The invoking function thus created is included in the UNITY library file. Then, the file creating section 130 creates the protected UNITY application by recompressing the UNITY library that includes the invoking function, encrypted programming library and decrypting library (S214). Upon request for executing the protected UNITY application (S216), the file executing section 140 loads the UNITY library file onto the memory 150 and then consecutively executes the functions in the UNITY library file (S218). When the invoking function is executed during executing the functions in the UNITY library file (S220), the file executing section 140 invokes the decrypting library using the invoking function (S222). The file executing section 140 executes the protected UNITY application by decrypting the encrypted programming library file (S224) by means of the decrypting library.

Figure 7:
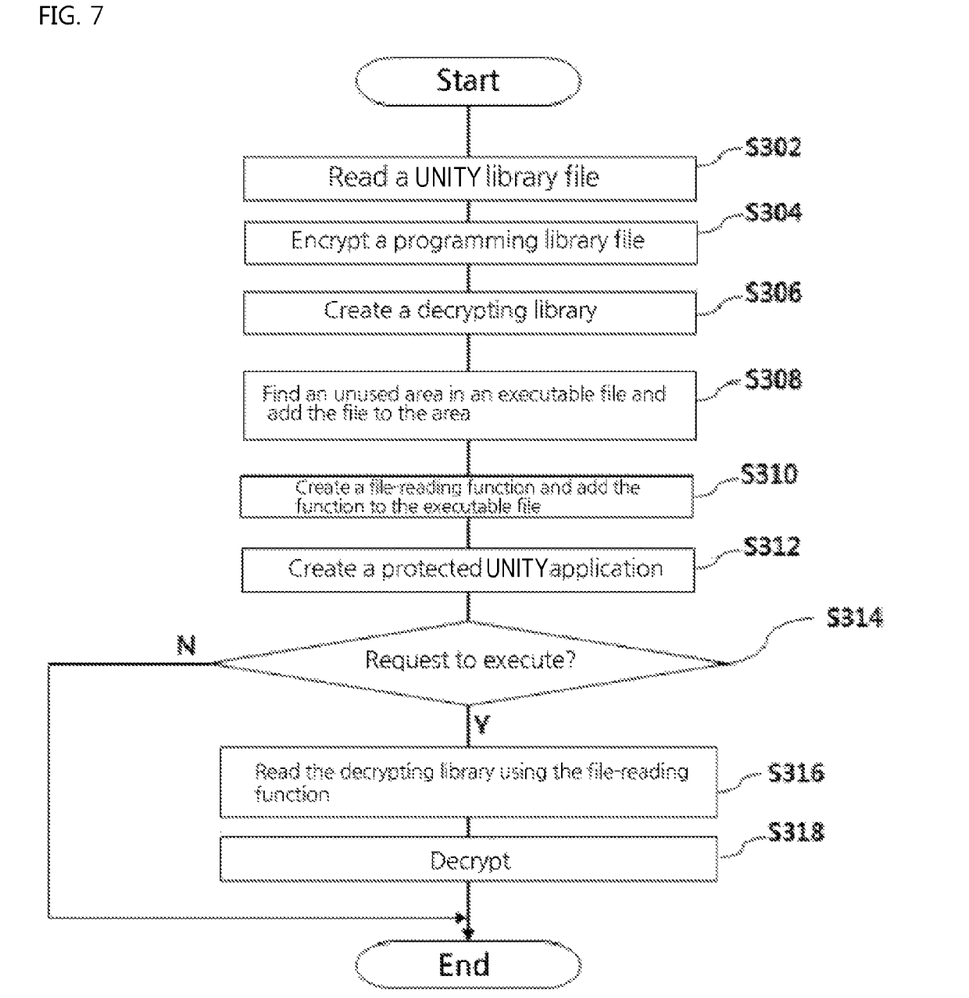
FIG. 7 is a flowchart that illustrates a procedure that an apparatus for managing a file according to another embodiment of the present invention protects and executes a UNITY application for the IOS platform.

FIG. 7 is a flowchart that illustrates a procedure that an apparatus for managing a file according to another embodiment of the present invention protects and executes a UNITY application for the IOS platform.

As illustrated in FIG. 7, the file extracting section 110 decompresses the UNITY application, or the IPA file, in the memory 150 then reads the UNITY library file (S302). The encrypting section 120 encrypts the programming library file in the UNITY library file (S304) then provides the file creating section 130 with the encrypted programming library file. The file creating section 130 creates the decrypting library that decrypts the encrypted programming library file (S306), finds the unused area in the IPA file and adds the decrypting library to the area (S308). Then the file creating section 130 creates the file-reading function including an address corresponding to the area and adds the address to the executable file (S310). Then the file creating section 130 creates the protected UNITY application by recompressing the executable file that includes the file-reading function and the decrypting library and the encrypted programming library (S312). Finally, upon request for executing the protected UNITY application (S314), the file executing section 140 reads the decrypting library file using the file-reading function in the executable file (S316) and executes the protected UNITY application by decrypting the encrypted programming file by means of the read decrypting library (S318).

REFERENCE NUMERALS

110: File extracting section
120: Encrypting section
130: File creating section
140: File executing section
150: Memory

What is claimed is:

1. An apparatus for managing a gaming engine file in a mobile platform including:
   a file extracting memory section that extracts a gaming engine library file from a gaming engine application;
   an encrypting memory section that encrypts a programming library file in the gaming engine library file thus extracted and creates an encrypted programming library file;
   a file creating memory section that creates a decrypting library to decrypt the encrypted programming library file and creates a secured gaming engine application using the decrypting library and the encrypted programming library file; and
   a file executing memory section that, upon request to execute the secured gaming engine application, executes the secured application by decrypting the encrypted programming library file using the decrypting library;
   wherein, for the gaming engine application which has a format that is executable in a first mobile operating platform, the file creating memory section calculates an address from which the decrypting library is invoked by obtaining and using the basic address of the gaming engine application and the address of the function to hook, and creates the secured gaming engine application so that the decrypting library is to be invoked from the calculated address; and wherein, for the gaming engine application which has a format that is executable in a second mobile operating platform, the file creating memory section creates the secured gaming engine application by finding an area that the executable file in the gaming engine library file does not use and adding to the unused area a file-reading function that can read the decrypting library;

wherein the first mobile operating platform and the second mobile operating platform are different mobile operating systems.

2. A method for managing a gaming engine file in a mobile platform including:
- a step via which a file extracting section extracts a gaming engine library file from a gaming engine application;
- a step via which an encrypting section encrypts a programming library file in the gaming engine library file thus extracted and creates an encrypted programming library file;
- a step via which a file creating section creates a decrypting library to decrypt the encrypted programming library file;
- a step via which the file creating section creates a secured gaming engine application using the decrypting library and the encrypted programming library file;
- a step via which a file executing section loads, upon request to execute the secured gaming engine application, the gaming engine library file of the secured gaming engine application onto a memory; and
- a step via which the file executing section executes the secured gaming engine application by decrypting the encrypted programming library file using the decrypting library in the secured gaming engine application;

wherein, for the gaming engine application which has a format that is executable in a first mobile operating platform, the step that creates the secured gaming engine application includes:
- a step that obtains the basic address of the gaming engine application and the address of the function to hook;
- a step that calculates, using the basic address and the obtained address, an address from which the decrypting library is invoked and creates a invoking function so that the decrypting library is to be invoked from the calculated address; and
- a step that creates the secured gaming engine application using the gaming engine library file including the invoking function, encrypted programming library and decrypting library; and wherein, for the gaming engine application which has a format that is executable in a second mobile operating platform, the step that creates the secured gaming engine application includes:
- a step that finds an area that the executable file in the gaming engine library file does not use;
- a step that adds to the unused area a file-reading function that can read the decrypting library; and
- a step that creates the secured gaming engine application using the executable file that includes the file-reading function and the encrypted programming library:

wherein the first mobile operating platform and the second mobile operating platform are different operating systems.

* * * * *